(12) United States Patent
Takeuchi et al.

(10) Patent No.: US 8,497,042 B2
(45) Date of Patent: Jul. 30, 2013

(54) FUEL CELL SYSTEM

(75) Inventors: Kazufumi Takeuchi, Yokohama (JP);
Hiromichi Miwa, Yokohama (JP);
Masaharu Hatano, Yokohama (JP);
Keiko Kushibiki, Fujisawa (JP); Dong Song, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 635 days.

(21) Appl. No.: 12/673,876

(22) PCT Filed: Sep. 8, 2008

(86) PCT No.: PCT/IB2008/002364
§ 371 (c)(1),
(2), (4) Date: Feb. 17, 2010

(87) PCT Pub. No.: WO2009/034449
PCT Pub. Date: Mar. 19, 2009

(65) Prior Publication Data
US 2011/0045366 A1  Feb. 24, 2011

(30) Foreign Application Priority Data
Sep. 14, 2007 (JP) ................................ 2007-238728

(51) Int. Cl.
*H01M 8/06* (2006.01)
(52) U.S. Cl.
USPC ........... 429/413; 429/423; 429/444; 429/450; 429/456

(58) Field of Classification Search
USPC ............... 429/408–414, 13, 19, 20, 22, 24, 429/25, 26, 30, 434, 423, 444, 450, 456
See application file for complete search history.

(56) References Cited

U.S. PATENT DOCUMENTS

| 4,983,471 | A | 1/1991 | Reichner et al. |
| 5,082,752 | A * | 1/1992 | Koga et al. .................... 429/425 |
| 6,331,366 | B1 * | 12/2001 | Van Dine et al. ............. 429/425 |
| 2001/0016274 | A1 * | 8/2001 | Kawasumi et al. ............ 429/20 |
| 2002/0081469 | A1 * | 6/2002 | Nomura et al. ................ 429/19 |
| 2009/0011299 | A1 | 1/2009 | Yokoyama |

FOREIGN PATENT DOCUMENTS

| FR | 2 875 951 A1 | 3/2006 |
| JP | 2003-163021 | 6/2003 |
| JP | 2003-272689 | 9/2003 |
| JP | 2006-107946 A | 4/2006 |
| JP | 2006-318798 | 11/2006 |
| WO | 2007/045103 A2 | 4/2007 |
| WO | 2007/102445 A1 | 9/2007 |

* cited by examiner

*Primary Examiner* — Raymond Alejandro
*Assistant Examiner* — Jimmy K Vo
(74) *Attorney, Agent, or Firm* — Young Basile

(57) ABSTRACT

Disclosed is a fuel cell system comprising a reformer and a fuel cell body to which a fuel gas reformed through the reformer and air are supplied and in which the supplied fuel gas and air are separated from each other and caused to flow and contact on respective electrodes to perform electric power generation. A moisture quantity adjustment device is configured to adjustably separate a portion of moisture included in the fuel gas supplied from the reformer in order for the moisture included in the fuel gas to be supplied to the fuel cell body in an appropriate quantity.

10 Claims, 7 Drawing Sheets

FUEL CELL SYSTEM

CROSS-REFERENCE TO RELATED APPLICATION

This application claims priority from Japanese Patent Application Serial No. 2007-238728, filed Sep. 14, 2007, which is incorporated herein in its entirety by reference.

TECHNICAL FIELD

The invention relates generally to a fuel cell system, and, more particularly, to a fuel cell system in which a fuel gas reformed through a reformer and air are separated from each other in a fuel cell body and are caused to flow and contact on respective electrodes of the fuel cell body to perform electric power generation.

BACKGROUND

Japanese Patent Application Publication No. Heisei 3-216966, published on Sep. 24, 1991 (which corresponds to U.S. Pat. No. 4,983,471, issued on Jan. 8, 1991) exemplifies a previously proposed fuel cell system. In that fuel system, a catalytic reforming material is disposed in a channel extended from a gas mixer to a solid oxide fuel cell (SOFC) and part of a spent fuel containing steam is supplied to the gas mixer to be mixed with a reformable fuel (a fresh feed fuel). Thereafter, the mixed gas is supplied to a reformer and the SOFC.

BRIEF SUMMARY

Taught herein are embodiments of a fuel cell system. One fuel cell system comprises a reformer and a fuel cell body to which a fuel gas reformed through the reformer and air are supplied and in which the supplied fuel gas and air are separated from each other and caused to flow and contact on respective electrodes to perform an electric power generation. This fuel cell system also includes a moisture quantity adjustment device configured to adjustably separate a portion of moisture included in the fuel gas supplied from the reformer in order for the moisture included in the fuel gas to be supplied to the fuel cell body in an appropriate quantity.

This embodiment of the invention and others are described in additional detail hereinafter.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

In the previously proposed fuel cell system described in the above-identified Japanese Patent Application Publication, a large quantity of moisture supply is needed to prevent both of a reduction in a reforming efficiency and a degradation of the catalytic reforming material (viz., the reformer), and, on the other hand, a large quantity of extra water is generated at a subsequent stage to the reformer. Consequently, steam (water vapor) causes a fuel cell body to be degraded and causes a reaction efficiency thereof to be reduced. Furthermore, there is a possibility of these problems occurring during a time at which a load is varied and where the electric power generation is changed from a low output power to a high output power, causing the steam quantity to become insufficient.

Embodiments of the invention, in contrast, provide a fuel cell system that can quickly respond to load variations and can supply a fuel gas containing an appropriate quantity of moisture to a fuel cell body while avoiding a reduction in reaction efficiency with carbon precipitation and a degradation of the fuel cell body caused by suppressed steam.

Reference is hereinafter made to the drawings in order to facilitate a better understanding of the invention.

Figure 1:
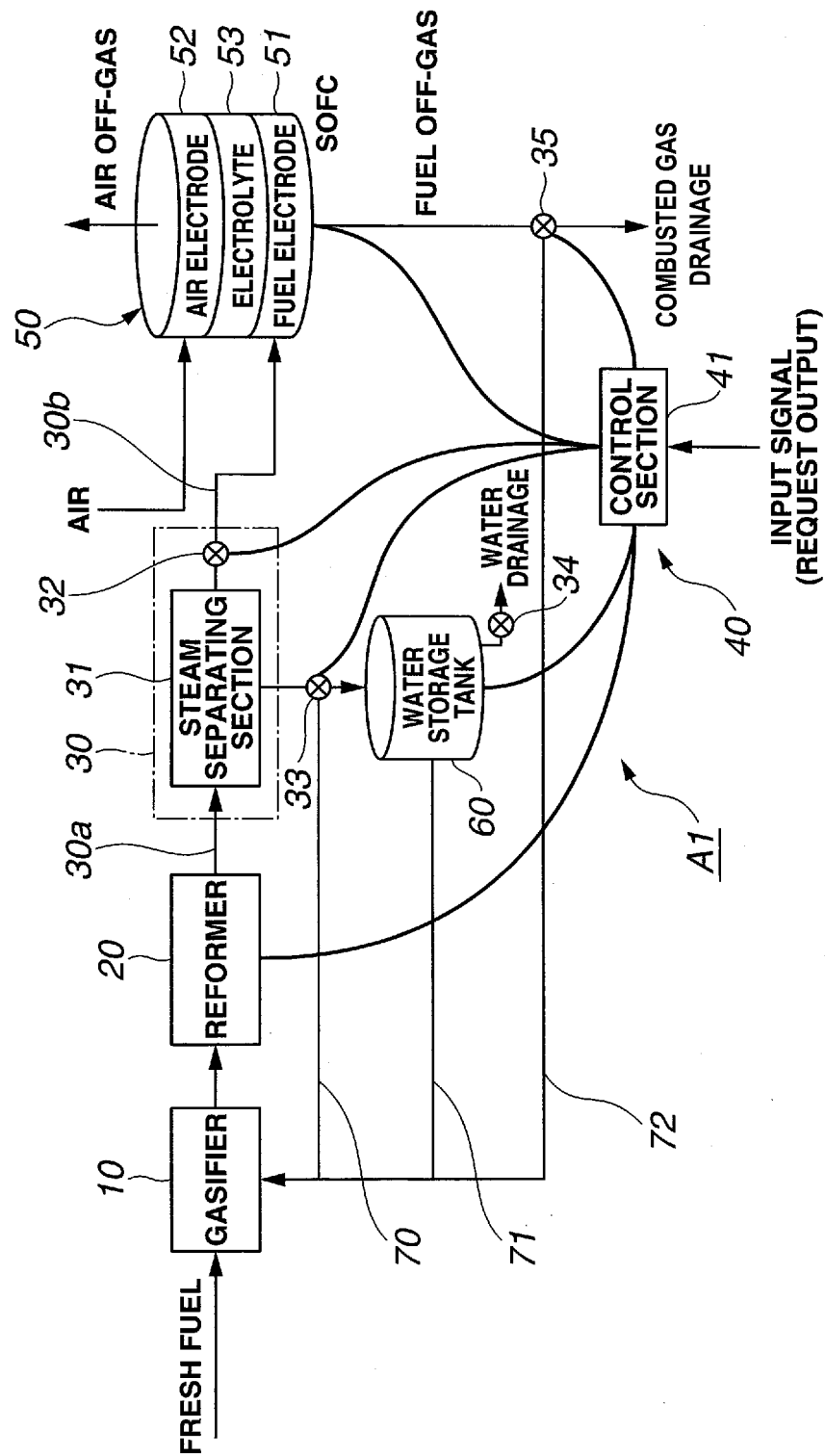
FIG. 1 shows a block diagram representing a structure of a fuel cell system in a first embodiment according to the invention.

A fuel cell system denoted by A1 in the first embodiment as shown in FIG. 1 mainly includes a gasifier 10, a reformer 20, a moisture quantity adjustment device 30, a feedback control unit 40, a fuel cell body 50 and a water storage tank 60.

Gasifier 10 performs a function of mixing and gasifying an externally-fed fresh fuel, a fuel off-gas exhausted from fuel cell body 50, a steam separated from the fuel gas at moisture quantity adjustment device 30 and a moisture supplied from water storage tank 60. It should be noted that the term moisture in the first embodiment includes water and/or steam (or water vapor).

Reformer 20 in the first embodiment is of a steam reforming type and mixes the fuel gas supplied from gasifier 10 with steam used as the moisture to generate hydrogen and carbon dioxide. Reformer 20 may, for example, be a combination of a partial oxidization reforming type with the steam reforming type.

When the steam reforming type is used reformer 20 is driven at a steam-carbon ratio (S/C) of 1 or more and preferably of 2 or more to improve reforming efficiency and to prevent carbon precipitation in fuel cell body 50. Where reformer 20 is the combination of the steam reforming type with the partial oxidization reforming type, the moisture quantity to be supplied to reformer 20 may appropriately be set in accordance with a rate between the steam reforming and the partial oxidization reforming.

Moisture quantity adjustment device 30 includes a steam separating section 31 (also called a moisture separating section) having a function of separating a part of the moisture included in the fuel gas supplied from reformer 20 (from the supplied fuel gas) and a pressure regulating valve actuator 32 arranged to regulate a pressure of the fuel gas supplied from steam separating section 31. Pressure regulating valve actuator 32 is driven in response to a drive signal supplied from control section 41, and a valve opening angle of pressure regulating valve actuator 32 is transmitted to control section 41 at a predetermined timing.

Figure 2:
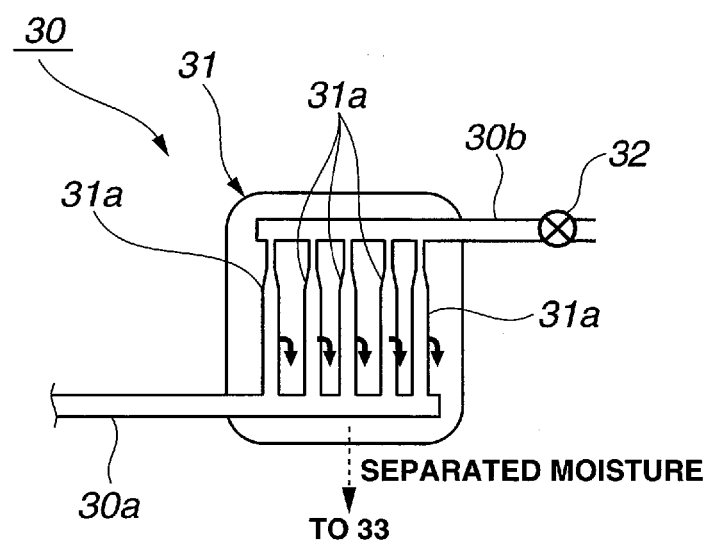
FIG. 2 shows an explanatory view representing a schematic configuration of a moisture separating section shown in FIG. 1.

Steam separating section 31 includes, as shown in FIG. 2, a plurality of tubular bodies 31a mutually disposed in parallel to each other. Each tubular body 31a is formed by a separation membrane to separate the steam included in the fuel gas from the fuel gas. Each tubular body 31a is interlinked between a downstream end of a gas channel 30a disposed at a gas flow exit side of reformer 20 and an upstream end of a gas channel 30b disposed at a gas flow entrance side of fuel cell body 50.

The separation membrane is made of a non-organic material, for example, zeolite or silica, and separates the steam included in the supplied fuel gas from the fuel gas as described above. It should be noted that a material of the separation membrane is not limited as long as the material has this function. In addition, the separation membrane may be a porous membrane (a molecular sieve), a non-porous membrane (a solution-diffusion model), or a combination of the porous and non-porous membranes. Furthermore, the separation membrane of a type that permeates only the steam or, conversely, of a type that permeates only the fuel gas but does not permeate the steam may be adopted. A combination of these types may be used to separate an arbitrary quantity of the steam from the fuel gas.

Returning now to FIG. 1, a moisture feedback pipe 70 is formed between gasifier 10 and steam separating section 31 as a first feedback channel for the separated moisture from the fuel gas at steam separating section 31 to be fed back to reformer 20.

A distributing valve actuator 33 is disposed in moisture feedback pipe 70 to distribute the steam circulated through moisture feedback pipe 70 into reformer 20 and water storage tank 60. Distributing valve actuator 33 is driven in response to the drive signal supplied from control section 41, as will be described later. Valve opening angle information of distributing valve actuator 33 is transmitted to control section 41 at a predetermined timing.

Water storage tank 60 condenses the steam separated from the fuel gas and exhausted at steam separating section 31 and reserves the condensed moisture therein. A moisture feedback pipe 71 is formed between water storage tank 60 and gasifier 10 as a third feedback channel to feed back the moisture reserved in water storage tank 60 into reformer 20.

A moisture feed valve actuator 36 (shown in FIG. 3) to feed back the moisture reserved into water storage tank 60 to reformer 20 is disposed in moisture feedback pipe 71. The valve opening angle information of moisture feed valve actuator 36 is transmitted to control section 41 at a predetermined timing. The moisture reserved in water storage tank 60 can be exhausted externally via a drain valve 34.

A moisture feedback pipe 72 extends between fuel cell body 50 and gasifier 10 as a second feedback channel to feed back the moisture generated in fuel cell body 50 into reformer 20. A distributing valve actuator 35 is disposed in moisture feedback pipe 72 to exhaust and distribute the moisture circulated through moisture feedback pipe 72 into reformer 20 and externally and is driven in response to a drive signal output from control section 41. Valve opening angle information of distributing valve actuator 35 is transmitted to control section 41 at a predetermined timing.

In fuel cell body 50, a fuel electrode (anode) 51 and an air electrode (cathode) 52 are disposed on upper and lower surfaces of electrolyte 53. Fuel cell body 50 is operated at a temperature equal to or higher than about 300° C. More specifically, fuel cell body 50 is of an oxygen ion conduction type SOFC driven under 600° C. through 1000° C., and a material of zirconia series, ceria series, or so forth can be used for electrolyte 53.

In addition, the invention is applicable to a proton conduction type fuel cell body that can be driven at a relatively high temperature (300° C. or higher) and in which a solid oxide (for example, cesium hydrogen-phosphate $Cs_2HPO_4$) is used for the electrolyte. The invention is particularly effective when applied to a fuel cell body where a fuel electrode material such as Ni, which easily generates carbon precipitation, is used for fuel electrode 51.

Figure 3:
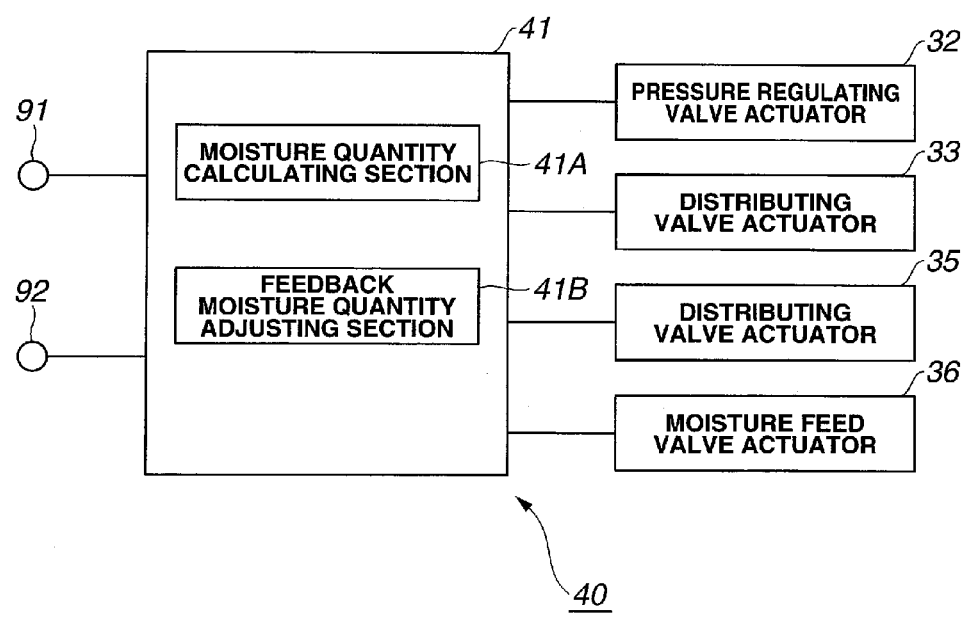
FIG. 3 shows a block diagram representing a schematic configuration of a feedback control unit shown in FIG. 1.

Next, feedback control unit 40 is explained with reference to FIG. 3. Feedback control unit 40 allows a part of the moisture included in the fuel gas supplied from reformer 20 to be adjustably separated therefrom so that the moisture included in the fuel gas is supplied to fuel cell body 50 to provide an appropriate quantity. Feedback control unit 40 includes control section 41, sensors 91, 92 and each of valve actuators 32, 33, 35, and 36 described above. The appropriate quantity means a quantity of moisture that is neither excessive nor insufficient and that accords with a driving state of fuel cell body 50.

Control section 41 is central to control of this feedback control unit 40 and has an input side connected to a reformer temperature sensor 91 to detect a temperature of reformer 20 and to a fuel cell temperature sensor 92 to detect a temperature of fuel cell body 50 via an interface to detect their respective temperatures at predetermined time intervals.

Control section 41, furthermore, has an output side connected to pressure regulating valve actuator 32, distributing valve actuators 33 and 35 and moisture feed valve actuator 36 via another interface. Control section 41 includes memory storing predetermined moisture quantity calculating information and a reforming efficiency of reformer 20 in accordance with the detected temperature of reformer 20.

Control section 41 generally consists of a microcomputer including a central processing unit (CPU), input and output ports (I/O), random access memory (RAM), keep alive memory (KAM), a common data bus and read only memory (ROM) as an electronic storage medium for executable programs and the certain stored values as discussed above. The various sections of the control section 41 could be, for example, implemented in software as the executable programs, or could be implemented in whole or in part by separate hardware in the form of one or more integrated circuits (IC). Control section 41 exhibits the following respective functions by executing predetermined programs or otherwise.

First, control section 41 calculates the moisture quantity included in the fuel gas to be supplied to fuel cell body 50 based on the predetermined moisture quantity calculating information using a moisture quantity calculating section 41A. The predetermined moisture quantity calculating information includes, in this embodiment, a request signal, an electric power generation output, a flow quantity of a fuel gas, a composition of the fuel gas, a temperature of the fuel gas, the temperature of reformer 20, a fuel cell body temperature of fuel cell body 50 and a history of increase-and/or-decrease adjustment in moisture quantity adjustment device 30. The request signal is information indicating a fuel quantity to be fed to reformer 20. The flow quantity of the fuel gas is measured by means of a flowmeter (not shown) attached to each of valve actuators 32, 33, 35 and 36. The composition of fuel gas is an addition of the moisture quantity exhausted from fuel cell body 50 to the fuel (for example, supplied to fuel cell body 50). The pieces of predetermined moisture quantity calculating information are sampled and stored for each of predetermined sampling time intervals into a memory within control section 41.

Control section 41 also adjusts the moisture quantity to be fed back to reformer 20 based on the calculated moisture quantity using a feedback moisture quantity adjusting section 41B. A feedback moisture quantity from steam separating section 31, water storage tank 60 and fuel cell body 50 toward reformer 20 is adjusted based on any one of the pieces of predetermined moisture quantity calculating information or a combination of any two or more of the pieces of predetermined moisture quantity calculating information in order for the moisture included in the fuel gas supplied to fuel cell body 50 to provide the appropriate quantity.

Specifically, an open-or-close drive of each of pressure regulating valve actuator 32, distributing valve actuators 33, 35, and moisture feed valve actuator 36 causes a moisture quantity to be included in the fuel gas supplied to fuel cell body 50 to provide the appropriate quantity.

Figure 4:
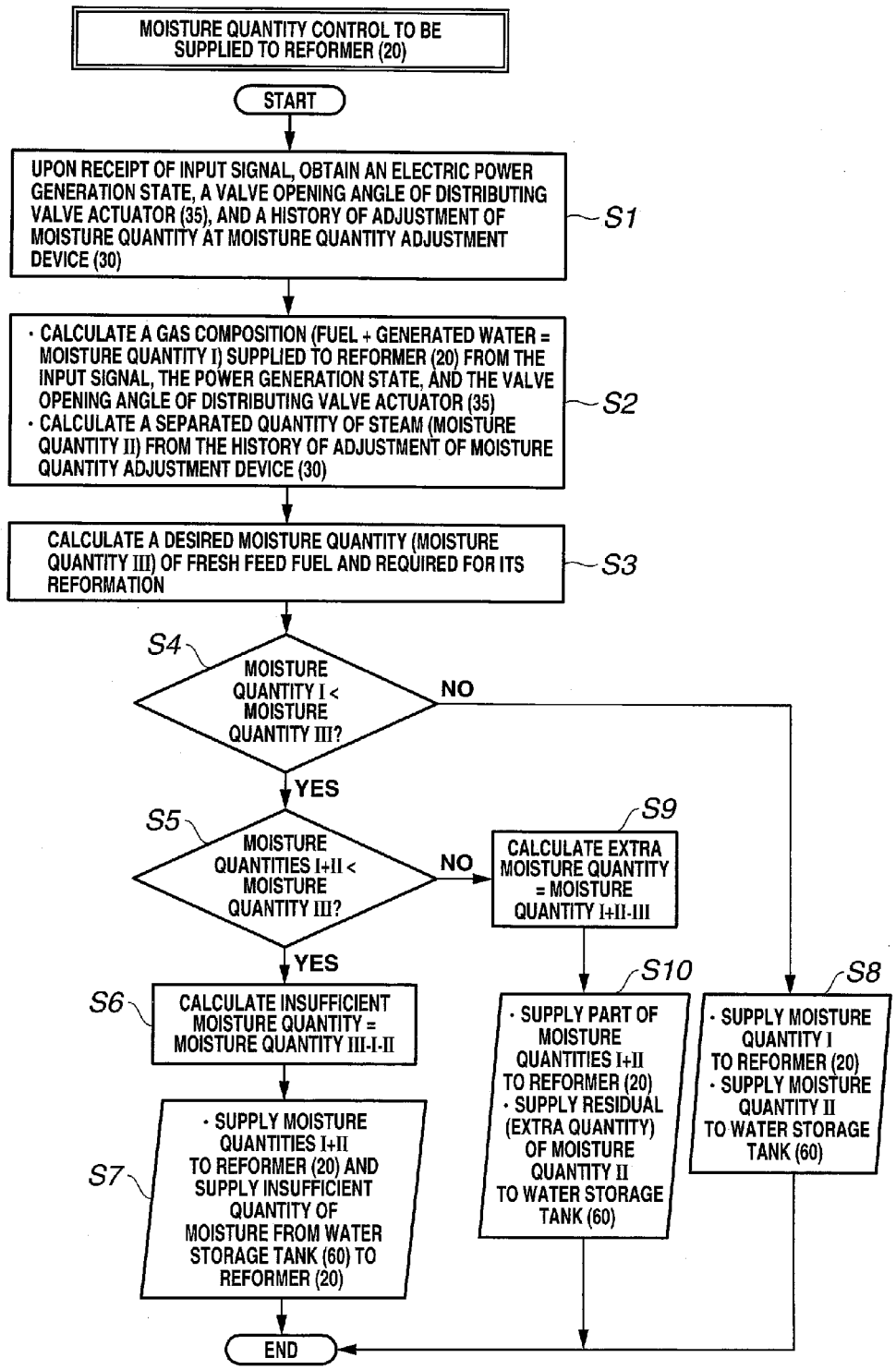
FIG. 4 shows a flowchart representing a control operation for a moisture quantity to be supplied to a reformer shown in FIG. 1.

Next, an operation of fuel cell system A1 in the first embodiment described above is explained with reference to FIGS. 4 and 5. Control operation of the moisture quantity fed back to reformer 20 is explained with reference to FIG. 4.

Upon receipt of an input signal (the request signal), control section 41 obtains the electric power generation state of fuel cell body 50, the valve opening angle information of distributing valve actuator 35 and a history of increase-and/or-decrease adjustment of moisture quantity adjustment device 30 in step S1. The routine then goes to step S2.

In step S2, control section 41 calculates the composition of the fuel gas supplied to reformer 20 (hereinafter referred to as a moisture quantity I) based on the input signal, the electric power generation state, the valve opening angle information of distributing valve actuator 35 and the history of increase-and/or-decrease adjustment of moisture quantity adjustment device 30. Control section 41 also calculates the steam quantity separated from the fuel gas (hereinafter referred to as a moisture quantity II) based on the history of the increase-and/or-decrease adjustment of moisture quantity adjustment device 30. Then, the routine goes to step S3. The composition of the fuel gas used hereinabove is the addition of the moisture quantity exhausted and fed back from fuel cell body 50 to the moisture quantity included in the fresh feed fuel.

Control section 41 calculates the moisture quantity included in the fresh feed fuel and required for the reformation of the fresh feed fuel (hereinafter referred to as moisture quantity III) in step S3, and the routine goes to step S4.

In step S4, control section 41 determines whether moisture quantity III is larger than moisture quantity I. If moisture quantity III is larger than moisture quantity I, the routine goes to step S5, but the routine goes to step S8 if moisture quantity I is not larger than moisture quantity III.

In step S5, control section 41 determines whether a sum of moisture quantity I and moisture quantity II (I+II) is larger than moisture quantity III. If the sum of moisture quantities I and II is larger than moisture quantity III, the routine goes to step S6. If the sum is not larger than moisture quantity III, the routine goes to step S9.

Control section 41 calculates a difference of the sum of moisture quantities I and II from moisture quantity III in step S6. That is, control section 41 calculates an insufficient moisture quantity, and the routine goes to step S7.

In step S7, control section 41 feeds back the sum of moisture quantities I and II to reformer 20 and the insufficient moisture quantity from water storage tank 60 to reformer 20, and the process ends.

On the other hand, at step S8, control section 41 distributes moisture quantity I to reformer 20 and distributes moisture quantity II to water storage tank 60, and the process ends.

In step S9, control section 41 calculates a difference of the sum of moisture quantity I and II from moisture quantity III, namely, calculates an extra moisture quantity (I+II−III), and the routine goes to step S10.

In step S10, control section 41 supplies a part of the moisture quantity (I+II) that is the addition of moisture quantities I and II to reformer 20 and distributes the extra quantity (or residual of (I+II−III) of moisture quantity II into water storage tank 60. The process then ends.

Figure 5:
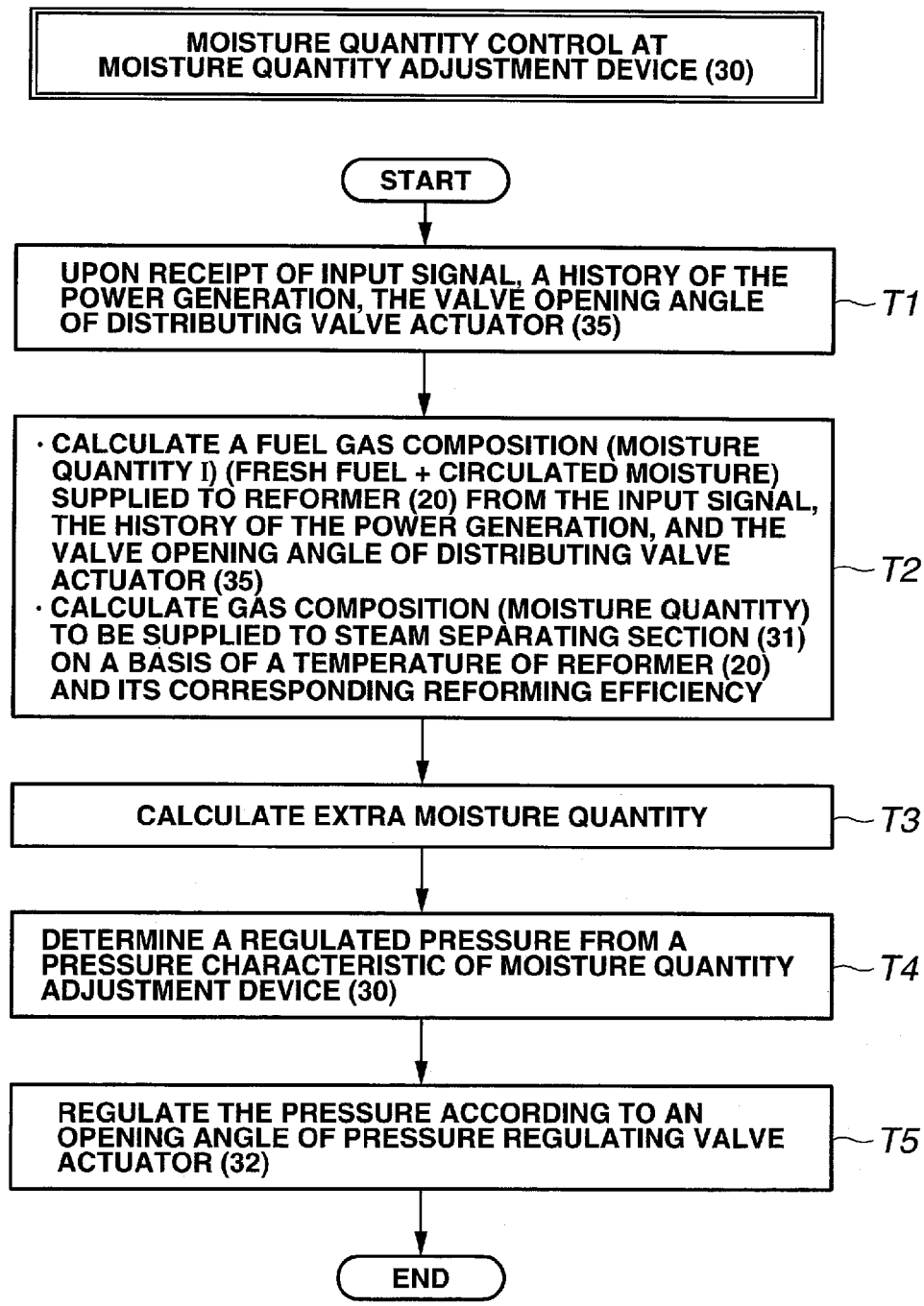
FIG. 5 shows a flowchart representing a moisture quantity control operation at a moisture quantity adjustment device shown in FIG. 1.

Next, the increase-and/or-decrease control operation of the moisture quantity to be separated at steam separating section 31 is explained with reference to FIG. 5.

First, control section 41 obtains the input signal (request signal), the history of the electric power generation and the valve opening angle of distributing valve actuator 35 in step T1, and the routine goes to step T2.

In step T2, control section 41 calculates the composition of the fuel gas (hereinafter referred to as "moisture quantity I") to be supplied to reformer 20 based on the input signal, the history of the electric power generation and the valve opening angle of distributing valve actuator 35. Control section 41 also calculates the moisture quantity (the composition of the fuel gas) supplied to steam separating section 31 based on the temperature of reformer 20 and the corresponding reforming efficiency. Then, the routine goes to step T3, where control section 41 calculates the extra quantity of moisture and then goes to step T4.

In step T4, control section 41 determines the pressure to be regulated from a pressure characteristic of steam separating section 31, and the routine goes to step T5.

In step T5, control section 41 performs increase-and/or-decrease control of the opening angle of pressure regulating valve actuator 32 to increase or decrease the pressure within steam separating section 31. Then, the routine ends.

As described hereinabove, the following advantages can be obtained.

(A) Since part of moisture included in the fuel gas supplied from reformer 20 is adjustably separated, the fuel gas containing the appropriate quantity of moisture in accordance with the driving state of fuel cell body 50 can be supplied to fuel cell body 50. Consequently, degradation of the fuel cell body and a reduction in the reaction efficiency thereof can be prevented. In addition, since the fuel cell system according to the present embodiment can quickly respond to the load variation, a fuel utilization rate thereof and a thermal efficiency thereof can be improved.

(B) Since the moisture separated at moisture quantity adjustment device 30 is fed back to and circulated toward reformer 20, it is not necessary to replenish a required moisture from external to the fuel cell system. In other words, the fuel cell system according to the present embodiment can achieve a self-sufficiency of moisture. In addition, in a case where the moisture separated by moisture quantity adjustment device 30 is in a steam state (not condensed), it is possible to supply the moisture in the steam state to reformer 20. Hence, as compared with a case where the moisture in a liquid phase is gasified and then supplied to reformer 20, a loss of thermal energy can remarkably be reduced. Thus, the fuel cell system can quickly respond to the load variation, there can be a small sizing of the fuel cell system, and a further improvement in the thermal efficiency can be achieved.

(C) Since the moisture separated at moisture quantity adjustment device 30 (and more particularly steam separating section 31) can be reserved in water storage tank 60, the moisture separated at moisture quantity adjustment device 30 can be collected and stored. Hence, when the water generated at fuel cell body 50 is circulated toward reformer 20, and when the moisture separated at moisture quantity adjustment device 30 is fed back to and circulated toward reformer 20, the moisture quantity to be supplied to reformer 20 can become insufficient. In this case, the moisture can be supplied from water storage tank 60. Thus, the fuel cell system can cope using a small quantity of moisture that can be fed back and circulated in case of load variations where the electric power generation output state of fuel cell body 50 gradually increases or decreases.

(D) Since the various valve actuators are combined and disposed in the first, second and third feedback channels, the steam separated at steam separating section 31, the moisture reserved in water storage tank 60 and the moisture generated at fuel cell body 50 can be distributed and supplied to reformer 20 in a desired rate. Consequently, it is not necessary to replenish the required moisture from an external source. In other words, self-sufficiency of moisture exists. Especially, the water generated in the fuel cell body is fed back and circulated together with the fresh feed fuel. Thus, the fuel utilization rate can be improved. In addition, part or whole of the moisture required for the reformation of the fresh fed (unreformed) fuel can be furnished by the generated water. Furthermore, when the generated water is circulated, it is desirable to circulate the moisture without liquefaction (condensation) of the moisture from the standpoint of reducing energy losses.

(E) Since the steam is separated from the fuel gas at steam separating section 31, thermal efficiency can be improved. That is, if the moisture is condensed (or liquefied) when the moisture is separated from the fuel gas, the temperature of the fuel gas is accordingly reduced. Therefore, when the fuel and appropriate quantity of the moisture are supplied to the fuel cell body 50, it is necessary to raise again the fuel gas temperature to a predetermined temperature. If the fuel cell system is constituted by a fuel cell body of a relatively low temperature drive such as a Proton Exchange Membrane (PEM) fuel cell or so forth, the corresponding energy loss is minor. However, if the fuel cell system is constituted by a fuel cell body of a high temperature drive such as Solid Oxide Fell Cell (SOFC) or so forth, the corresponding energy loss is large. Hence, it is desirable to separate the moisture in the steam state rather than have liquefaction of the moisture. In addition, it is desirable from the standpoint of reducing energy losses to feed back and circulate the separated moisture into reformer 20 for its re-utilization while maintaining the steam state rather than have the liquefaction of the separated moisture where the separated moisture is supplied to the reformer for its re-utilization.

(F) The quantity of moisture included in the fuel gas is controlled to the quantity of moisture in accordance with the fuel gas composition supplied from the reformer 20 before the fuel gas is supplied to the fuel cell body 50. Thus, even if load variations frequently occur, an optimum moisture quantity can be supplied to the fuel cell body.

(G) The supply quantity of the moisture separated at the moisture quantity adjustment device 30 to the reformer 20 is controlled in accordance with the feedback-and-circulation quantity of the generated water in the fuel cell body 50 to the reformer 20. In other words, the moisture included in anode off-gas exhausted from the fuel cell body 50 is fed back to and circulated toward the reformer 20 together with the fresh feed fuel so that thermal efficiency can be improved.

Figure 6:
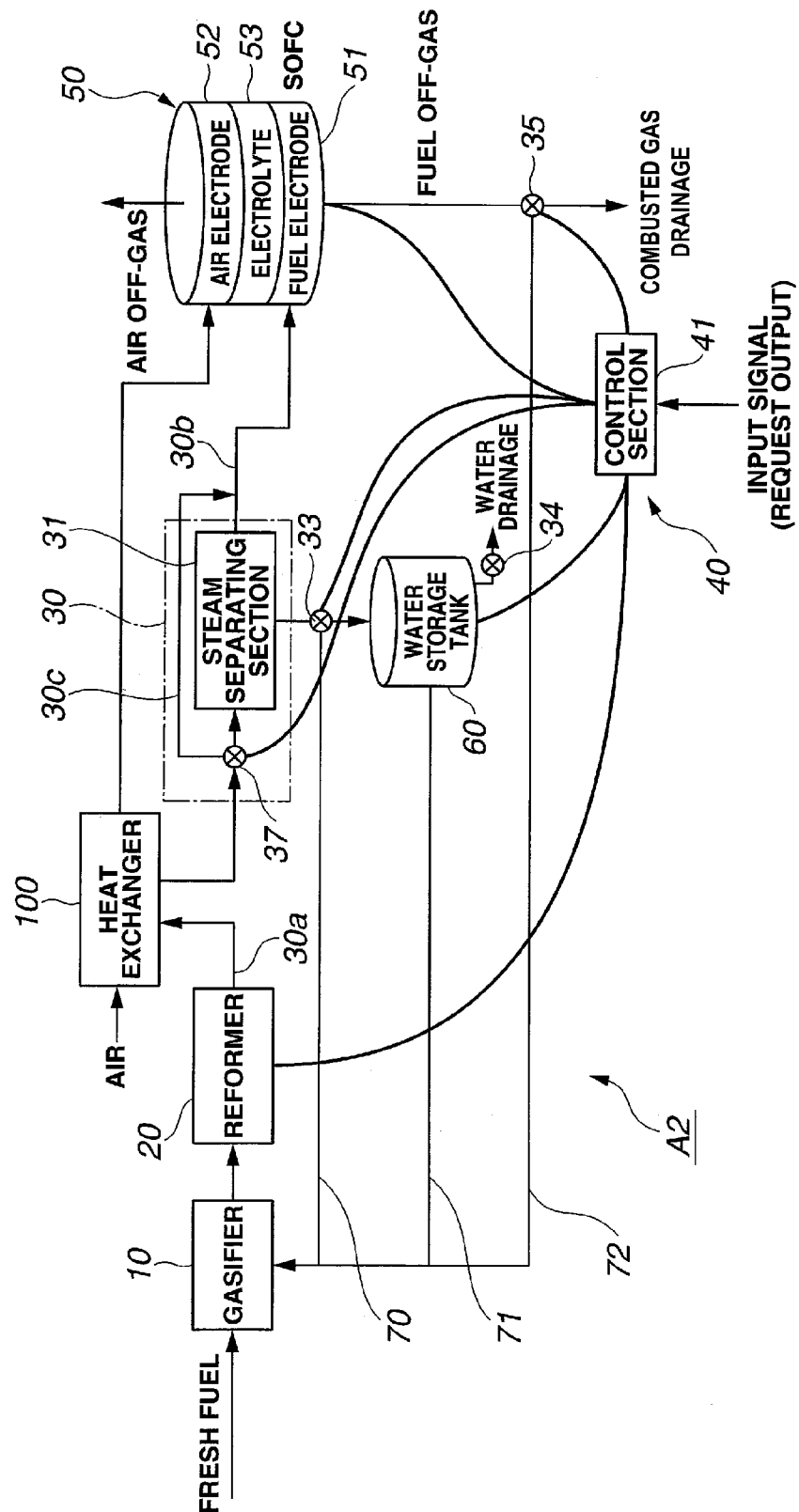
FIG. 6 shows a block diagram representing the fuel cell system in a second embodiment according to the invention.

Next, a fuel cell system A2 in a second embodiment according to the invention is described with reference to FIG. 6. It should be noted that the same reference numerals as those explained in the first embodiment designate like elements, and the detailed description thereof is hereinafter omitted.

In fuel cell system A2 in the second embodiment, a heat exchanger 100 is disposed on the channel directed from reformer 20 toward steam separating section 31. Heat exchanger 100 performs a heat exchange between externally-supplied air and the fuel gas supplied from reformer 20 and is interposed in gas channel 30*a* extending from reformer 20 to steam separating section 31. This heat exchanger 100 is arranged to perform a temperature adjustment of the fuel gas supplied from reformer 20 toward steam separating section 31.

A bypass valve actuator 37 is disposed in gas channel 30*a* to switch the passage of the fuel gas supplied from reformer 20 to a bypass passage 30*c* extending to fuel cell body 50 and bypassing steam separating section 31. Bypass valve actuator 37 is driven to be appropriately switched in response to a switch signal supplied from control section 41.

Heat exchanger 100 enables a temperature adjustment to an operable temperature of the steam separating section 31 and enables temperatures of the fuel gas and the steam to be reduced to a predetermined temperature. In addition, energy loss can be reduced by performing heat exchange between the air supplied to the fuel cell body 50 as a refrigerant and the fuel gas and the steam supplied to the reformer 20. That is to say, thermal efficiency can be improved.

Figure 7:
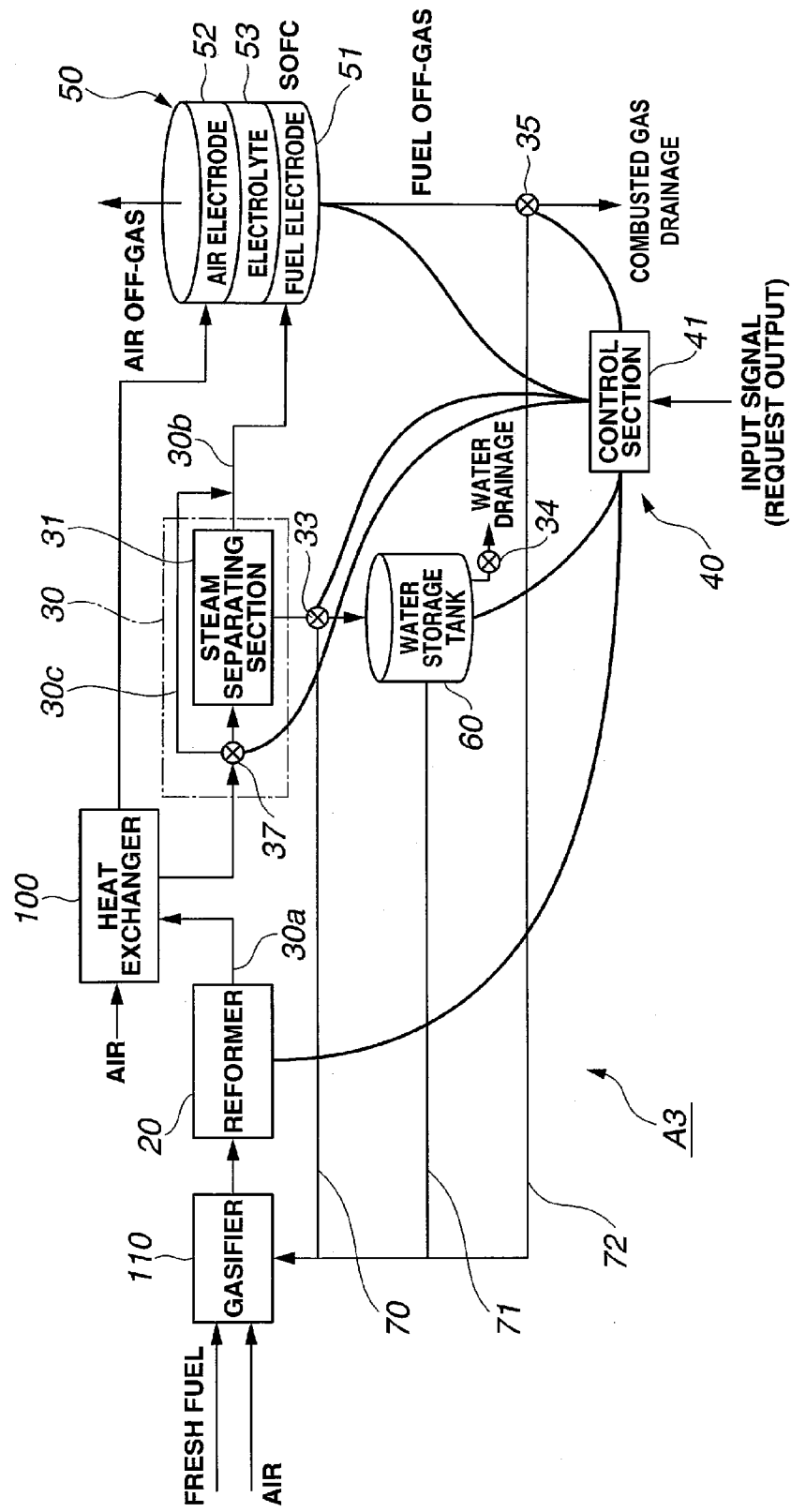
FIG. 7 shows a block diagram representing the fuel cell system in a third embodiment according to the invention.

Next, a fuel cell system A3 in a third embodiment according to the invention is explained with reference to FIG. 7. It should be noted that the same reference numerals as those described in the first and second embodiments designate like elements, and the detailed descriptions thereof are herein omitted.

In fuel cell system A3 in the third embodiment, the external air is inputted into gasifier 110 together with the fresh feed fuel to have the mixture of fuel gas and external air subjected to the steam reforming and partial oxidization reforming and the external air is also inputted into heat exchanger 100.

As described above, the steam and external air are supplied to reformer 20 so that the fuel cell system has the advantages of both the steam reforming having a high reforming efficiency characteristic and the partial oxidization reforming having a high startability and a high response characteristic. Furthermore, a highly efficient driving of the fuel cell system can be achieved by raising a percentage of the steam reforming to the partial oxidization reforming in a steady state while raising the percentage of the partial oxidization reforming to the steam reforming during a drive start state of the fuel cell system and during a high load state.

The above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A fuel cell system comprising:
   a reformer;
   a fuel cell body to which a fuel gas reformed through the reformer and air are supplied and in which the supplied fuel gas and air are separated from each other and caused to flow and contact on respective electrodes to perform electric power generation;
   a moisture quantity adjustment device configured to adjustably separate a portion of moisture included in the fuel gas supplied from the reformer;
   a pressure regulating valve actuator disposed in a gas channel extending from the moisture quantity adjustment device to the fuel cell body that regulates a pressure of the fuel gas supplied from the moisture quantity adjustment device;
a first feedback channel disposed between the moisture quantity adjustment device and the reformer;
a second feedback channel disposed between the fuel cell body and the reformer;
a feedback control unit comprising:
a moisture quantity calculating section configured to: calculate a moisture quantity of the fuel gas supplied to the reformer; calculate a historical separated quantity of moisture from the moisture quantity adjustment device; and calculate a target moisture quantity of a fresh fuel for reformation; and a feedback moisture quantity adjusting section configured to determine an amount of moisture to provide to the reformer in order for the moisture included in the fuel gas to be supplied to the fuel cell body in an appropriate quantity, wherein the feedback control unit is configured to: drive an open or close position of the pressure regulating valve actuator so that the moisture in the fuel gas supplied to the fuel cell body is the appropriate quantity, send the moisture to be fed back to the reformer via the first feedback channel, and provide the moisture generated in the fuel cell body to be fed to the reformer via the second feedback channel;
a first distributing valve actuator that distributes the moisture circulated through the second feedback channel to the reformer and to external the fuel cell system, wherein the feedback control unit is configured to drive an open or close position of the first distributing valve actuator so that the moisture in the fuel gas supplied to the fuel cell body is the appropriate quantity;
a water storage tank that reserves the moisture separated at the moisture quantity adjustment device; and
a third feedback channel that feeds moisture reserved in the water storage tank to the reformer.

2. The fuel cell system as claimed in claim 1, further comprising:
a second distributing valve actuator disposed in the first feedback channel to distribute the moisture circulated through the first feedback channel to the reformer and to the water storage tank, wherein the feedback control unit is configured to drive an open or close position of the second distributing valve actuator so that the moisture in the fuel gas supplied to the fuel cell body is the appropriate quantity.

3. The fuel cell system as claimed in claim 1, further comprising:
a moisture feed valve actuator disposed in the third feedback channel that regulates the moisture supplied from the water storage tank to the reformer, wherein the feedback control unit is configured to drive an open or close position for the moisture feed valve actuator so that the moisture included in the fuel gas supplied to the fuel cell body is the appropriate quantity.

4. The fuel cell system as claimed in claim 1, further comprising:
a heat exchanger that exchanges heat between the fuel gas supplied from the reformer and air directed toward the fuel cell body.

5. The fuel cell system as claimed in claim 1, wherein the moisture quantity calculating section is configured to use predetermined moisture quantity calculating information including at least one of a requested output, a power generation output, a gas flow quantity, a gas composition, a gas temperature, a temperature of the reformer and a temperature of the fuel cell body; and the feedback moisture quantity adjusting section adjusts the quantity of the portion of the moisture to be fed back to the reformer based on one or more of the predetermined moisture quantity calculating information.

6. The fuel cell system as claimed in claim 1, wherein the moisture quantity adjustment device comprises a separation membrane disposed to separate moisture from the fuel gas.

7. The fuel cell system as claimed in claim 6 wherein the separation membrane is made of a non-organic material.

8. The fuel cell system as claimed in claim 1, wherein the feedback moisture quantity adjusting section is configured to:
determine whether the target moisture quantity of the fresh fuel is greater than the moisture quantity of the fuel gas supplied to the reformer; and
if the target moisture quantity of the fresh fuel is not greater than the moisture quantity of the fuel gas supplied to the reformer, send to the reformer the moisture quantity of the fuel gas supplied to the reformer and send the historical separated quantity of moisture from the moisture quantity adjustment device to the water storage tank.

9. The fuel cell system as claimed in claim 8, wherein the feedback moisture quantity adjusting section is configured to: determine whether the target moisture quantity of the fresh fuel is greater than the moisture quantity of the fuel gas supplied to the reformer;
if the target moisture quantity of the fresh fuel is greater than the moisture quantity of the fuel gas supplied to the reformer, determine if the target moisture quantity of the fresh fuel is greater than both the moisture quantity of the fuel gas supplied to the reformer and the historical separated quantity of moisture from the moisture quantity adjustment device; and if not, calculate an extra moisture quantity in both the moisture quantity of the fuel gas supplied to the reformer and the historical separated quantity of moisture from the moisture quantity adjustment device and supply the extra moisture quantity to the reformer while supplying a residual moisture amount to the water storage tank.

10. The fuel cell system as claimed in claim 8, wherein the feedback moisture quantity adjusting section is configured to: determine whether the target moisture quantity of the fresh fuel is greater than the moisture quantity of the fuel gas supplied to the reformer;
if the target moisture quantity of the fresh fuel is greater than the moisture quantity of the fuel gas supplied to the reformer, determine if the target moisture quantity of the fresh fuel is greater than both the moisture quantity of the fuel gas supplied to the reformer and the historical separated quantity of moisture from the moisture quantity adjustment device; and if so, calculate a shortage of moisture quantity in both the moisture quantity of the fuel gas supplied to the reformer and the historical separated quantity of moisture from the moisture quantity adjustment device and supply the shortage of moisture quantity to the reformer from the water storage tank.

* * * * *